Nov. 11, 1958 T. E. MADDOX 2,860,288
SAFETY CONTROL SYSTEMS FOR FUEL BURNERS
Filed Oct. 13, 1954 2 Sheets-Sheet 1

INVENTOR
THOMAS E. MADDOX
BY
ATTORNEY

Nov. 11, 1958 T. E. MADDOX 2,860,288
SAFETY CONTROL SYSTEMS FOR FUEL BURNERS
Filed Oct. 13, 1954 2 Sheets-Sheet 2

INVENTOR
THOMAS E. MADDOX

2,860,288
Patented Nov. 11, 1958

2,860,288

SAFETY CONTROL SYSTEMS FOR FUEL BURNERS

Thomas E. Maddox, Brooklyn, N. Y.

Application October 13, 1954, Serial No. 462,049

1 Claim. (Cl. 317—149)

This invention relates to a safety control system for fuel burners, and is a continuation in part of my co-pending application Serial No. 397,892 filed December 14, 1953, now abandoned.

The widespread utilization of gas, natural gas, and petroleum derivatives in fuel burners requires new and improved equipment to detect flame failure.

In general, many of the prior safety control devices are complex, require frequent service and are not fully reliable upon component failures, that is the safety fails to cut off the system it seeks to protect.

It is a prime object of the invention to provide a simplified electronic control circuit and associate equipment for use with fuel burners.

It is another object of the invention to provide an improved electronic circuit and associate equipment for use with fuel burning devices, wherein the circuit contains a minimum of components.

It is another object of the invention to provide an improved flame detector device for use with fuel burning equipment, which is economical to manufacture, positive in operation, and requires a minimum of service.

Other objects and advantages of the invention will be apparent to those skilled in the art from a reading of the following specification when taken with the drawing, wherein.

Figure 6:
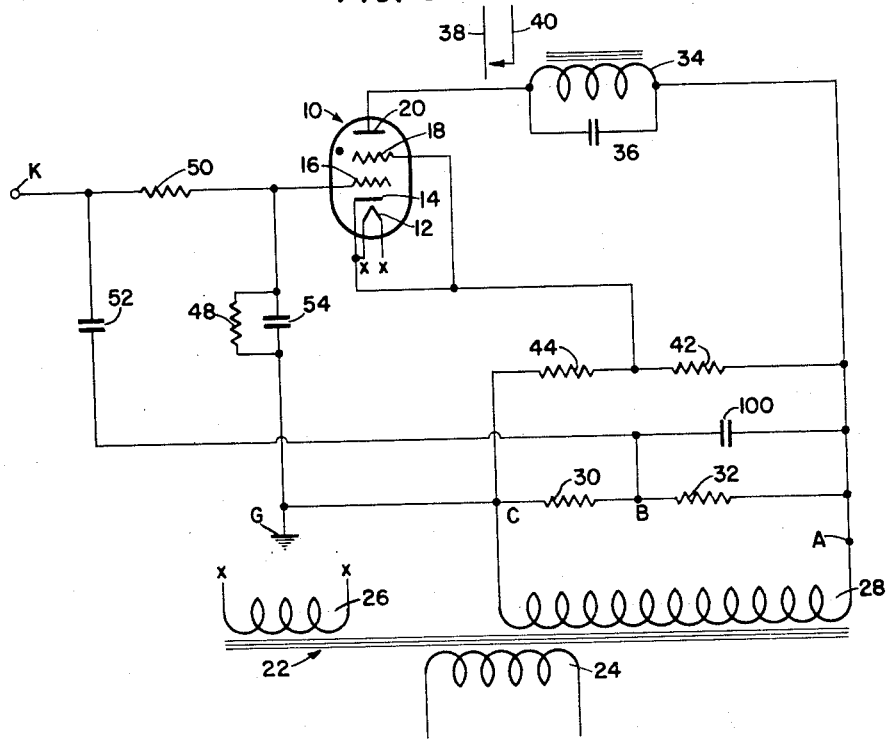
Figure 6 is a circuit diagram incorporating the control circuit of the invention.

Referring to the drawing in detail, and Figure 6 in particular, the circuit of my invention includes a gaseous type electron tube 10, having a filament 12, a cathode 14, a control grid 16, screen grid 18 and anode 20.

A transformer 22 having a primary winding 24 at a predetermined voltage and frequency, is also provided with secondary windings 26 and 28. Winding 26 is formed with suitable voltage and current characteristics to supply the filament 12 of tube 10. Winding 28 is of higher voltage characteristics and is utilized for the anode circuit and bias circuit, as will hereinafter be described. For purposes of clarity, several connections associated with winding 28 have been designated as A, B and C.

Terminal A is connected to anode 20, through a relay coil 34, which is shunted by a capacitor 36, and acts to close relay contacts 38 and 40 during the period of current flow through the relay coil. The function of capacitor 36 is such that current stored therein maintains the coil 34 energized for a period of time when there is no current flowing in the anode circuit of electron tube 10.

The winding 28 of transformer 22 is shunted by a first voltage divider network composed of resistors 30 and 32, and a second voltage divider network including 42 and 44, with the latter providing means for obtaining a bias on the cathode 14 with respect to grid element 16. Grid 16 is connected to a third resistor network including resistor 48, resistor 50 and capacitor 52, arranged in circuit, with resistor 48 shunted by a capacitor 54.

For purposes of simplicity, and as a reference point, the designation G has been assigned to all points of the circuit commonly referred to as "ground." A terminal K is shown connected to grid 16 through resistor 50, and is the terminal to which an electrode 86 of a body pilot head assembly X is connected.

To provide the necessary flame detector equipment, reference is made to Figures 1 through 5, wherein pilot head assemblies are shown. Each of the heads shown are relegated to supply a resistive path between elements of the circuit shown in Figures 6 and 7, thus controlling the grid potential on grid 16 of tube 10.

A pilot assembly identified as X is shown formed with a body member 70 which has formed therein a fuel jet opening 72 and a plurality of air or combustion supporting material injecting jets 74 which lead to a mixing chamber 76. At the extremity of chamber 76 is mounted a combustion head Z. Head Z includes a central body member 80 of a conductive material having a high melting point, and an inner lava or ceramic coating thereon 78, and an outer lava or ceramic coating thereon, 80.

The inner ceramic or lava coating 78 is formed with an internal thread 79 which engages an external thread 81 on body member 70. It may here be pointed out that the lava or ceramic coatings are electrical insulators, and body member 80 is conductive.

A terminal L is formed of a threaded screw member and has thereon two nuts 85. A portion of the thread is inserted in a female thread 87, formed in central body member 80. An electrode 86 is secured to the threaded screw member and extends into the area generally occupied by the apex of a flame and into the flame area.

In utilizing the head as shown, the head is insulated from the body member 70, which under normal conditions would be grounded, and thus permits the utilization of a predetermined polarity voltage at terminal L which is connected to terminal K of Figure 6, during operation of the invention. A second electrode 90, is connected to G or ground and forms the second point, electrode 86 being the first, between which the flame is detected.

Figure 1:
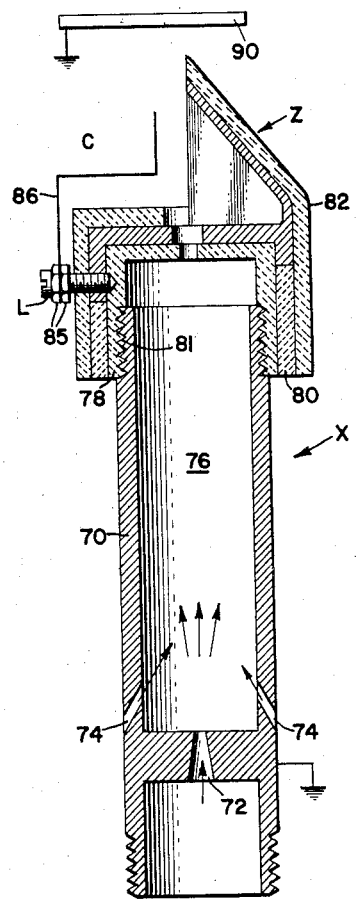
Figure 1 is a sectional view of a head utilized with the circuit of the invention, as taken along line 1—1 of Figure 2.
Figure 2:
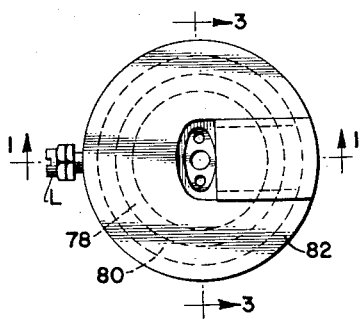
Figure 2 is a top view of the head of Figure 1.
Figure 3:
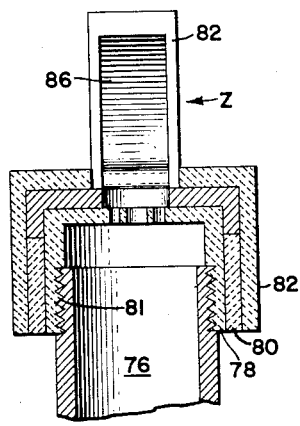
Figure 3 is a sectional view taken along line 3—3 of Figure 2.
Figure 4:
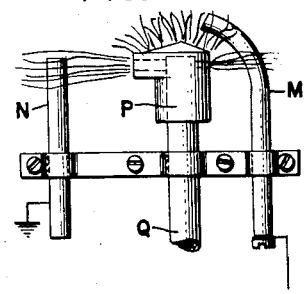
Figure 4 is a side view of an alternate head utilized with the circuit of my invention.
Figure 5:
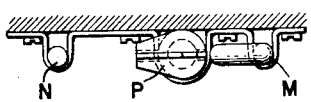
Figure 5 is a top view of the head of Figure 4, without a flame shown.

Figures 4 and 5 show an alternate flame detector assembly including an electrode M, whose function is comparable to that of electrode 86, and a ground electrode N whose function is analogous to that of electrode 90, the flame being shown about a head P formed of a ceramic or lava material. Head P is mounted on a supply source pipe Q.

In describing the operation of the safety control system of my invention, I desire first to describe the electrical condition of the circuit without the presence of a flame. Under these conditions, and with primary winding 24 of transformer 22 connected to a suitable source of electrical supply, a voltage and current are supplied to filament 12 of tube 10, causing the same to heat cathode 14 to operating temperature.

Since the source of supply is an alternating one, and the anode of tube 10 is fed by the alternating supply, it is not necessary to discuss conditions of the circuit during half cycles when the anode is negative, the tube then being non-conductive. During the positive half cycle, and without the presence of a flame, the grid is biased beyond the point of cut-off for the particular tube voltages applied to the anode and other electrodes. Under these conditions, relay coil 34 has no current passing therethrough, and contacts 38 and 40, which may be suitably connected in an electrical control circuit associated with a fuel supply source, are in open circuit relationship one to the other.

As a flame is introduced between electrodes 86 and 90, the bias voltage appearing at grid electrode 16 with respect to cathode 14 is reduced, and tube 10 becomes conductive, causing a current to flow through relay coil 34 and close contacts 38 and 40. The contacts 38 and 40, thus could be utilized to activate or retain activated the control for flow of a combustible fuel.

The purpose of capacitor 36 in the circuit is to eliminate any relay chatter due to the alternating current utilized in the anode circuit, and maintain the relay coil in operation during a predetermined time delay period as determined by the characteristics of the fuel burning system.

Having thus described my invention, it may be seen that failure of a tube would maintain contacts 38 and 40 in open condition.

A typical table of values for use in the circuit of the invention when utilizing an electron tube such as the 2050 or the like, and with winding 28 of the transformer supplying approximately 150 volts, is:

| | | |
|---|---|---:|
| 30 | ohms | 50,000 |
| 32 | do | 50,000 |
| 36 | microfarads | 60 |
| 42 | ohms | 100,000 |
| 44 | do | 1,000 |
| 48 | do | 25,000,000 |
| 50 | do | 22,000,000 |
| 52 | micromicrofarads | 2,000 |
| 54 | do | 3,000–5,000 |
| 100 | do | 50,000 |

Figure 7:
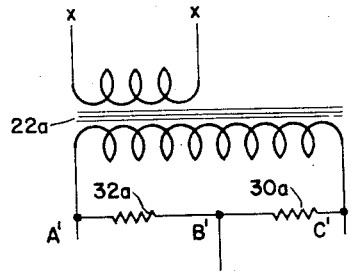
Figure 7 is an alternate circuit of power supply connection for bias and anode supply for the circuit of the invention.

Variations from the specific embodiment disclosed and the typical values for components referred to above will be obvious to those skilled in the art. The circuit alternate of Figure 7 is obviously only one such variation, and I therefore desire that my invention as defined in the claim be given as broad an interpretation as is consistent with the spirit and scope of the invention.

I claim:

A pilot safety device for connection to a source of alternating electrical potential having a first electrical line and a second electrical line comprising a gas filled electron device including a cathode, a control electrode and an anode; a relay coil and a pair of normally open contacts adapted to be closed upon passage of an electrical current through said relay coil, said relay coil connected to said anode at one of its terminals and to said first electrical line at its opposite terminal; a first potential divider network connected electrically between said first electrical line and said second electrical line, and having a potential obtained therefrom connected to said cathode of said electron device; a second potential divider network connected electrically between said first electrical line and said second electrical line, and having a potential obtained therefrom connected to a capacitor, the other terminal of said capaictor being electrically connected to a first electrode and through a resistor to said control electrode; the potential difference between said cathode and said control electrode being of a magnitude to bias electron device to prevent a current flow between said cathode and said anode; said first and second electrodes being spaced for placement in a flame so as to change said bias potential between said cathode and control electrode to make said electron device conductive for a current between said cathode and said anode.

References Cited in the file of this patent

UNITED STATES PATENTS

| | | |
|---|---|---|
| 2,102,618 | Francis | Dec. 21, 1937 |
| 2,385,699 | Fox | Sept. 25, 1945 |
| 2,640,920 | Cairns | June 2, 1952 |
| 2,664,489 | Dickey | Dec. 29, 1953 |
| 2,676,286 | Buchner | Apr. 20, 1954 |